(12) United States Patent
Lehtovirta et al.

(10) Patent No.: US 8,621,200 B2
(45) Date of Patent: Dec. 31, 2013

(54) KEY DELIVERY METHOD AND APPARATUS IN A COMMUNICATIONS SYSTEM

(75) Inventors: Vesa Petteri Lehtovirta, Espoo (FI); Karl Norrman Norrman, Stockholm (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 1640 days.

(21) Appl. No.: 11/815,683

(22) PCT Filed: Dec. 16, 2005

(86) PCT No.: PCT/EP2005/056859
§ 371 (c)(1), (2), (4) Date: Aug. 29, 2007

(87) PCT Pub. No.: WO2006/084522
PCT Pub. Date: Aug. 17, 2006

(65) Prior Publication Data
US 2008/0114978 A1  May 15, 2008

(30) Foreign Application Priority Data
Feb. 14, 2005  (GB) .................................. 0502888.1

(51) Int. Cl.
*G06F 21/00* (2013.01)
(52) U.S. Cl.
USPC ............. 713/155; 380/30; 380/270; 380/282; 705/54; 705/59; 726/4; 726/26; 709/231
(58) Field of Classification Search
USPC ......................................................... 713/155
See application file for complete search history.

(56) References Cited

U.S. PATENT DOCUMENTS

| | | | | |
|---|---|---|---|---|
| 4,771,461 A * | 9/1988 | Matyas | .......................... | 380/282 |
| 5,146,497 A * | 9/1992 | Bright | ........................... | 380/273 |
| 5,175,765 A * | 12/1992 | Perlman | ......................... | 380/30 |
| 5,351,293 A * | 9/1994 | Michener et al. | ............. | 713/171 |
| 6,105,134 A * | 8/2000 | Pinder et al. | .................. | 713/170 |
| 6,314,519 B1 * | 11/2001 | Davis et al. | ...................... | 726/4 |
| 6,516,412 B2 * | 2/2003 | Wasilewski et al. | .......... | 713/168 |
| 7,171,553 B2 * | 1/2007 | Rix et al. | ...................... | 713/155 |
| 7,219,227 B2 * | 5/2007 | Hori et al. | ...................... | 713/158 |
| 7,324,805 B2 * | 1/2008 | Nakakita et al. | .............. | 455/411 |

(Continued)

OTHER PUBLICATIONS

Why Cryptosystems Fail|http://meslab.snu.ac.kr/courses/2007f/dip/papers/12-Anderson94.pdf|Ross Anderson|1993|pp. 1-13.*

*Primary Examiner* — Mahfuzur Rahman

(57) ABSTRACT

In order to facilitate access to encrypted broadcast or multicast data an encrypted service key is sent from an access server of the communication network to the user terminal, passing the encrypted service key to a secure module of the user terminal. The secure module has access to a decryption key for decrypting the encrypted service key but this decryption key is inaccessible to other functions of the user terminal. Acknowledgement of receipt of the service key at said secure module, and sending the acknowledgement from the user equipment to the access server; authenticating the receipt at the access server and sending a return acknowledgement from the access server to the user terminal, and passing the return acknowledgement to the secure module; and authenticating the return acknowledgement at the secure module, and subsequently making the decrypted service key available to the user terminal, the service key making possible directly or indirectly the decryption of broadcast and/or multicast data.

8 Claims, 1 Drawing Sheet

(56) References Cited

U.S. PATENT DOCUMENTS

| | | |
|---|---|---|
| 7,539,306 B2* | 5/2009 | Ohta et al. .................... 380/201 |
| 7,568,234 B2* | 7/2009 | Naslund et al. ................. 726/26 |
| 2001/0046299 A1* | 11/2001 | Wasilewski et al. .......... 380/282 |
| 2003/0078061 A1* | 4/2003 | Kim ............................... 455/466 |
| 2004/0117500 A1* | 6/2004 | Lindholm et al. ............ 709/231 |
| 2005/0013439 A1* | 1/2005 | Collet ........................... 380/270 |
| 2005/0071280 A1* | 3/2005 | Irwin et al. ...................... 705/59 |

\* cited by examiner

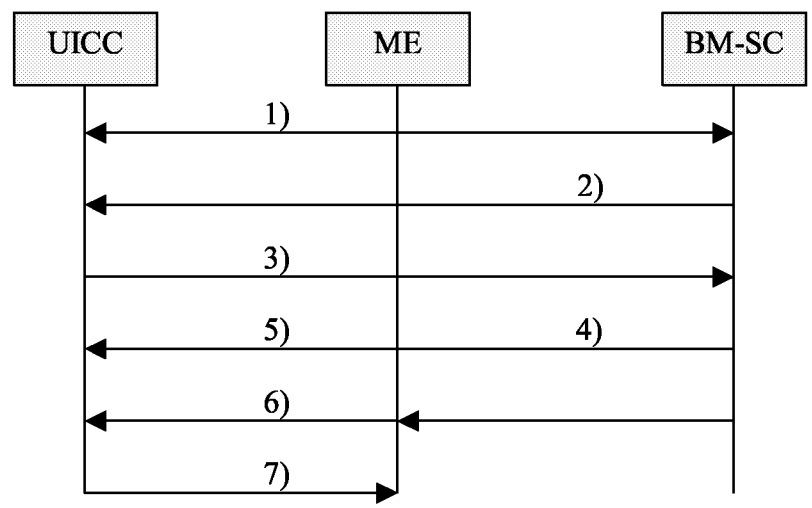

KEY DELIVERY METHOD AND APPARATUS IN A COMMUNICATIONS SYSTEM

FIELD OF THE INVENTION

The present invention relates to a key delivery method and apparatus in a communications system, and more particularly to a method and apparatus for delivering service keys associated with a multimedia broadcast/multicast system.

BACKGROUND TO THE INVENTION

Today, there are many applications in which data is broadcast or multicast to a group of individual receivers via some communication channel. Terrestrial and satellite television and radio transmissions are obvious examples. In the Internet, streaming video and audio signals can be broadcast or multicast to individual Internet terminals using the Internet Protocol (IP). In the very near future, technologies such as those defined by 3GPP will allow the broadcasting/multicasting of streaming IP data to mobile handsets. Subscribers will be able to listen to music and watch concerts and football games via their mobile handsets.

For a number of reasons, it is often necessary to be able to send multicast signals (it will be appreciated that reference here to "multicast" is only by way of example and that the following discussion applies equally to broadcast signals) in such a way that only authorised receivers can make use of the signals. The nature of the material may make this necessary, for example to prevent children from viewing adult content. In the case of a subscription service, it may be necessary to prevent receivers who have not paid for a service from using a received signal.

3GPP is currently developing a multicast system called MBMS (Multimedia Broadcast/Multicast System) in which a service key (MSK) is distributed from a BM-SC (Broadcast/Multicast Service Center) to UEs (User Equipments) that have joined a specific service. The MUK is a key shared between the BM-SC and a specific UICC, i.e., each UICC has its own MUK. The UEs use this service key to access the multicast data by decrypting subsequently sent traffic encryption keys (MTK) encrypted with the MSK. The MBMS system requires that the UE has a trusted module (i.e. trusted by the BM-SC) where the MSK is stored. The communication between the trusted module (here called Universal IC Card or UICC) and the BM-SC is protected with a key called MUK (MBMS User Key). The mobile equipment (ME) does not know the MUK nor the MSK, but is provided with the MTK following receipt and decryption by the UICC.

One of the charging models for 3GPP is that the users will be charged for provision of this MSK. In order to provide accurate and fair charging it is important that the service key is delivered reliably to the UE (i.e. the UE needs to acknowledge the reception of the MSK), otherwise it could happen that a UE might be out of coverage at the time of service key delivery and would not get the service key, yet would be charged for the service. MBMS therefore allows for the possibility that the UICC return a service key reception acknowledgement to the BM-SC upon successful receipt by the UICC of the MSK. It is however possible for a malicious UE implementation to refrain from sending the service key reception acknowledgement to the BM-SC in order to avoid being charged. Not even the protected nature of communications between the UICC and BM-SC (achieved using the MUK) guarantees that the reception acknowledgement gets through to the BM-SC since the acknowledgement must travel via the ME that could be malicious and drop it.

SUMMARY OF THE INVENTION

It is proposed here to solve this potential problem by preventing use of the MSK by the UE until a further, protected, release message has been received by the UICC from the network. This release message is only sent after the network has received the key acknowledgement message from the UE. This provides a three-way handshake.

According to a first aspect of the present invention there is provided a method of facilitating access by a user terminal to broadcast and/or multicast data which is encrypted and sent to the user terminal from a communication network, the method comprising:

sending an encrypted service key from an access server of the communication network to the user terminal, and passing the encrypted service key to a secure module of the user terminal, the secure module having access to a decryption key for decrypting the encrypted service key but this decryption key being inaccessible to other functions of the user terminal;

generating an acknowledgement of receipt of the service key at said secure module, and sending the acknowledgement from the user equipment to the access server;

authenticating the receipt at the access server and sending a return acknowledgement from the access server to the user terminal, and passing the return acknowledgement to the secure module; and authenticating the return acknowledgement at the secure module, and subsequently making the decrypted service key available to the user terminal, the service key making possible directly or indirectly the decryption of broadcast and/or multicast data.

The decrypted service key may be made available to the user terminal directly, or by allowing the secure module to process actions requiring use of the decrypted key, on behalf of the user terminal.

In certain embodiments of the present invention, the service key sent from the access server to the user terminal is encrypted with a symmetric encryption/decryption key known to the secure module and the access server. The acknowledgement of receipt and the return receipt may be signed with the shared symmetric key.

In other embodiments of the invention, the service key is encrypted with a public key of a public-private key pair, the private key being held by said secure module.

In certain embodiments of the invention, receipt and authentication of the acknowledgement of receipt at the access server triggers a charging of the user terminal or associated user for access to the service.

The service key may be made available to the user equipment immediately following receipt and authentication of the return acknowledgement. Alternatively, the service key may be made available at a later time, e.g. upon receipt by the user terminal of a traffic encryption key protected using the session key.

According to a second aspect of the present invention there is provided a user terminal comprising:

a secure module having access to a decryption key, the decryption key being inaccessible to other functions of the user terminal;

means for receiving an encrypted service key from an access server of the communication network, and for passing the encrypted service key to the secure module;

means within said secure module for generating an acknowledgement of receipt of the service key;
means for sending the acknowledgement from the user equipment to the access server;
means for receiving a return acknowledgement from the access server, and for passing the return acknowledgement to the secure module; and
means within the secure module for authenticating the return acknowledgement, and for making the decrypted service key available to the user terminal.

According to a third aspect of the present invention there is provided a Universal IC card for use with a user terminal, the Universal IC card comprising:
a memory for storing a decryption key, the decryption key being inaccessible to other functions of the user terminal;
means for receiving an encrypted service key from an access server of a communication network;
means for generating an acknowledgement of receipt of the service key;
means passing the receipt to the user terminal for sending to the access server;
means for receiving a return acknowledgement from the access server; and
means for authenticating the return acknowledgement, and for making the decrypted service key available to the user terminal.

According to a fourth aspect of the present invention there is provided an access server for facilitating access by a user terminal to broadcast and/or multicast data which is encrypted and sent to the user terminal from a communication network, the method comprising:
means for sending an encrypted service key to the user terminal;
means for receiving an acknowledgement of receipt of the service key, from the user terminal; and
means for authenticating the receipt and for sending a return acknowledgement to the user terminal.

BRIEF DESCRIPTION OF THE DRAWINGS

FIG. 1 illustrates a signalling exchange between a UICC, a mobile node, and a BM-SC associated with a secure service key delivery procedure.

DETAILED DESCRIPTION OF A PREFERRED EMBODIMENT

This innovation described here is based on the 3GPP MBMS standard TS 33.246 (v6.1.0). That standard specifies the use of particular protocols, e.g., Multimedia Internet Keying (MIKEY), for key management messages, but the solution presented here is not limited to only those protocols.

The system includes three relevant components. The ME (which is not trusted by the BM-SC), the UICC (trusted by BM-SC) and the BM-SC. The UICC typically resides inside the ME, but could be external to the ME. Although the terminology is not yet standardised, the UICC may implement the functionality currently referred to as MBMS key generation and validation function (MGV-F) and MBMS key generation and validation storage (MGV-S).

The procedure has the following steps, as illustrated in FIG. 1:
1) The UICC and BM-SC have established a shared secret MUK (MBMS User Key), e.g., using GBA (Generic Bootstrapping Architecture) procedures. The MUK is not known to the ME.
2) The BM-SC sends a MIKEY message to the ME which relays this message to the UICC. The MIKEY message is protected with the MUK, and includes a MBMS Service Key (MSK) with relevant identifiers and a valid lifetime for the MSK. Note that the ME cannot access the MSK key in the message since it does not possess the MUK.
3) The UICC receives the MIKEY message and checks it's authenticity using the MUK. If the check is successful, the UICC decrypts the message and stores the MSK. The UICC prepares an MSK verification message, protects it with the MUK, and sends the message to the BM-SC via ME. The UICC sets the state of the MSK to "INACTIVE" until it has received a response from BM-SC.
4) The BM-SC receives the MIKEY MSK verification message (protected with the MUK) from the UICC, and verifies it using the MUK. (The BM-SC potentially generates a charging record for this ME.) The BM-SC then prepares an acknowledgement response message, protects it with MUK, and sends it to the UICC.
5) When the UICC receives the MIKEY acknowledgement response, it checks the authenticity of the message with the MUK, and if the check is successful, the state of the MSK is set to "ACTIVE".
6) Later the ME receives a Traffic Key (MTK) message (encrypted with the MSK) from multicast transmission. The ME needs this MTK key to decrypt multicast data. The ME requests the UICC to decrypt the MTK with MSK.
7) The UICC checks if the MSK is in active state (i.e. the UE has been charged for the MSK) and if the lifetime has not yet expired. If the checks are successful, the UICC gives the decrypted MTK key to the ME. Otherwise the UICC responds with an error.

If the BM-SC does not receive the message in step 4) within a reasonable time frame, it can return to step 2) and resend the message. This loop can be repeated a suitable number of times to add additional reliability to the protocol.

It is generally true to say that if two messages have been successfully exchanged between the Mobile Equipment and the BM-SC, it is probable that the third messages will also be successfully delivered. (Typically, a point-to-point radio link will deliver packets reliably (albeit at a lower bit-rate) even if the radio conditions are bad.) Thus, the additionally third message in the handshake procedure introduced here is unlikely to detract from the reliability of the procedure to any significant extent, from the point of view of the Mobile Equipment. Of course, from the point of view of the service provider, reliability in terms of ensuring that the key has indeed been made available to the Mobile Equipment and that the subscriber should be charged, is greatly increased.

The description above illustrates the invention in the context of 3GPP MBMS. The invention could be generalized to other multicast systems that have a trusted module in the client and where it is necessary to ensure that the network receives the reception acknowledgement of the delivered key. For example, other possible applicable multicast systems might be 3GPP2 BCMCS, DVB-H IP DC and OMA BCAST. Note that the solution may require standardization efforts in the standardization bodies.

The invention claimed is:
1. A method, comprising:
facilitating access by a user terminal to broadcast and/or multicast data which is encrypted and sent to the user terminal from a communication network, the facilitating including:
sending an encrypted service key from an access server of the communication network to the user terminal, and passing the encrypted service key to a secure processing module of the user terminal, the secure processing module having access to a decryption key for decrypting the encrypted service key but the decryption key being inaccessible to other functions of the user terminal;

generating an acknowledgement of receipt of the encrypted service key at said secure processing module, and sending the acknowledgement of receipt from the user terminal to the access server;

authenticating the acknowledgement of receipt at the access server and sending a return acknowledgement from the access server to the user terminal, and passing the return acknowledgement to the secure processing module; and authenticating the return acknowledgement at the secure processing module, and subsequently making decrypted service key available to the user terminal, the decrypted service key making possible directly or indirectly decryption of encrypted broadcast and/or multicast data.

2. The method according to claim 1, the service key sent from the access server to the user terminal being encrypted with a symmetric encryption/decryption key known to the secure processing module and the access server, the acknowledgement of receipt and the return acknowledgement being authenticated using the known symmetric encryption/decryption key.

3. The method according to claim 1, wherein receipt and authentication of the acknowledgement of receipt at the access server triggers a charging of the user terminal or associated user for access to a service.

4. The method according to claim 1, wherein the decryption key is a symmetric decryption key.

5. A user terminal comprising:
at least one microprocessor;
a non-transitory computer-readable storage medium including computer-readable instructions, when executed by the at least one microprocessor, are configured to:
implement a secure processing module having access to a decryption key, the decryption key being inaccessible to other functions of the user terminal;
receive an encrypted service key from an access server of a communication network, and pass the encrypted service key to the secure processing module;
generate an acknowledgement of receipt of the encrypted service key;
send the acknowledgement of receipt of the encrypted service key from the user terminal to the access server, wherein decrypted service key is made available to the user terminal immediately following receipt and authentication of a return acknowledgement, or at a later time;
receive the return acknowledgement from the access server, and pass the return acknowledgement to the secure processing module; and
authenticate the return acknowledgement, and make the decrypted service key available to the user terminal.

6. A Universal IC Card for use with a user terminal, the Universal IC card comprising:
at least one microprocessor;
a non-transitory computer-readable storage medium including computer-readable instructions, when executed by the at least one processor, are configured to
store a decryption key, the decryption key being inaccessible to other functions of the user terminal;
receive an encrypted service key from an access server of a communication network;

generate an acknowledgement of receipt of the encrypted service key;
pass the acknowledgement of receipt of the encrypted service key to the user terminal for sending to the access server, wherein decrypted service key is made available to the user terminal immediately following receipt and authentication of a return acknowledgement, or at a later time;
receive the return acknowledgement from the access server; and
authenticate the return acknowledgement, and make the decrypted service key available to the user terminal.

7. An access server, comprising:
at least one microprocessor;
a non-transitory computer-readable storage medium including computer-readable instructions, when executed by at least one microprocessor, are configured to
facilitate access by a user terminal to broadcast and/or multicast data which is encrypted and sent to the user terminal from a communication network, wherein the computer-readable instructions configured to facilitate access further include instructions configured to
send an encrypted service key to the user terminal, the user terminal further comprising a secure processing module, wherein
the secure processing module having access to a decryption key for decrypting the encrypted service key but the decryption key being inaccessible to other functions of the user terminal;
receive an acknowledgement of receipt of the service key, from the user terminal; and
authenticate the acknowledgement of receipt of the encrypted service key and for sending a return acknowledgement to the user terminal, wherein decrypted service key is made available to the user terminal immediately following receipt and authentication of the return acknowledgement, or at a later time.

8. A method, comprising:
facilitating access by a user terminal to broadcast and/or multicast data which is encrypted and sent to the user terminal from a communication network, the facilitating including
sending, by a broadcast/multicast service center (BM-SC), a multimedia internet keying (MIKEY) message to the user terminal, wherein
the user terminal includes a universal IC card (UICC),
the MIKEY message is protected by a multimedia broadcast multicast service (MEMS) user key (MUK),
the MIKEY message includes a MBMS service key (MSK), and
the MUK is a shared secret between the BM-SC and the UICC;
authenticating, with the UICC, the MIKEY message using the MUK;
in response to successfully authenticating of the MIKEY message, decrypting, with the UICC, the MIKEY message and storing the MSK in the UICC;
preparing, using the UICC, a MSK verification message and encrypting the MSK verification message with the MUK;
authenticating, by the BM-SC, the MSK verification message using the MUK;
preparing, by the BM-SC, an acknowledgement response message, encrypting the acknowledgement response message with the MUK, and sending the acknowledgement response message to the UICC;

authenticating, by the UICC, the acknowledgement response message with the MUK and, in response to successfully authenticating the acknowledgement response message, setting the MSK to an active state;

in response to receiving a traffic key encrypted with the MSK from a multicast transmission, requesting, by the user terminal, the UICC to decrypt the traffic key with the MSK; and in response to determining that the MSK is in an active state, releasing, by the UICC, the traffic key to the user terminal.

* * * * *

UNITED STATES PATENT AND TRADEMARK OFFICE
CERTIFICATE OF CORRECTION

| | | |
|---|---|---|
| PATENT NO. | : 8,621,200 B2 | Page 1 of 1 |
| APPLICATION NO. | : 11/815683 | |
| DATED | : December 31, 2013 | |
| INVENTOR(S) | : Lehtovirta et al. | |

It is certified that error appears in the above-identified patent and that said Letters Patent is hereby corrected as shown below:

On the Title Page, in Item (75), under "Inventors", in Column 1, Line 2, delete "Karl Norrman Norrman," and insert -- Karl Norrman, --, therefor.

In the Claims

In Column 6, Line 50, in Claim 8, delete "(MEMS)" and insert -- (MBMS) --, therefor.

Signed and Sealed this
Eighth Day of July, 2014

Michelle K. Lee
*Deputy Director of the United States Patent and Trademark Office*